United States Patent [19]
Conca

[11] 4,129,234
[45] Dec. 12, 1978

[54] MICRO-PROPORTIONER APPARATUS FOR DIVIDED PRODUCTS

[75] Inventor: Gilbert G. Conca, Cabries, France

[73] Assignee: Transitube Project, Aix-En-Provence, France

[21] Appl. No.: 757,500

[22] Filed: Jan. 7, 1977

[30] Foreign Application Priority Data

Jan. 16, 1976 [FR] France ............................... 76 01925

[51] Int. Cl.² ........................................... G01F 11/06
[52] U.S. Cl. .................... 222/235; 222/287; 222/309
[58] Field of Search ............... 222/235, 227, 234, 256, 222/252, 287, 309, 377

[56] References Cited

U.S. PATENT DOCUMENTS

| | | | |
|---|---|---|---|
| 1,203,063 | 10/1916 | Shore | 222/235 |
| 1,859,290 | 5/1932 | Davis | 222/235 X |
| 2,252,150 | 8/1941 | Whitfield | 222/235 X |
| 2,439,566 | 4/1948 | Gamache | 222/309 X |
| 3,532,256 | 10/1970 | Knechtel | 222/235 X |

FOREIGN PATENT DOCUMENTS

1088348  10/1967  United Kingdom ..................... 222/235

Primary Examiner—Robert B. Reeves
Assistant Examiner—Charles A. Marmor
Attorney, Agent, or Firm—Lewis H. Eslinger

[57] ABSTRACT

The object of the invention is a micro-proportioner apparatus for divided or powdery products, especially colored pigments, which includes:
- a vertical hopper containing the divided products, equipped with a side-channel for outlet,
- a cylindrical rod which is moved periodically inside the said channel,
- and rotating paddles located preferably in two horizontal planes above and below the sliding rod.

11 Claims, 5 Drawing Figures

MICRO-PROPORTIONER APPARATUS FOR DIVIDED PRODUCTS

The object of the present invention is micro-proportioner apparatus for divided products, especially substances in the form of powder or granules.

Apparatus in accordance with the invention include in known fashion:
- a vertical hopper which contains a divided product and which includes close to the bottom a cylindrical side-channel for outlet of the products;
- a cylindrical rod which is coaxial with the said channel and which slides inside it;
- and means of driving the said rod periodically in alternating translation parallel with the axis of the said channel.

During the course of the account reference is made more especially to a micro-proportioner apparatus located at the outlet from a hopper which feeds with thermoplastic resins an injection press or a die. In an application of this kind the micro-proportioner is used for mixing with the resin a small amount of a colorant pigment or of any other powdery charge in proportions which vary depending upon the application but which are relatively small, of the order of 0.1 to 2% of the weight of resin.

The injection of the pigment into the resin must be synchronized with the operation of the injection press and the proportioning of the pigment must be carried out with good accuracy of the order of 1%.

It is to be made clear that the description of this particular application does not entail any restriction upon the scope of the invention which encompasses any similar application in which periodically a small closely determined quantity of a divided product contained in a hopper must be taken off.

Known proportioner apparatus equipped with a piston or a sliding rod display defects in accuracy due to poor flow of the product from the hopper to the proportioner piston.

One object of the present invention is to correct these defects in accuracy, especially in the case of divided products which are difficult of flow by gravity.

Another object of the present invention is to obtain a proportioner apparatus in which the divided products arrive in the outlet channel at substantially uniform density whatever the degree of fill of the hopper.

These objects are attained by means of a micro-proportioner apparatus which includes rotating paddles located close to the sliding rod and means of driving these paddles in rotation about a vertical axis.

Preferably a proportioner apparatus in accordance with the invention includes two groups of rotating paddles located in two horizontal planes located one above and the other below the sliding rod.

In a preferred embodiment the two groups of paddles are mounted on a vertical shaft end coaxial with the bottom of the hopper which is circular, and the apparatus includes means of driving the said shaft in rotation step by step in synchronism with the periodic movement of the sliding rod.

Preferably the hopper includes a fixed horizontal plate provided with an opening, which is located above the rotating paddles and defines with the bottom of the hopper a decompression chamber in which are located the said rotating paddles and the said sliding rod and into which the said side-channel for outlet of the products opens.

In this case the end of the vertical shaft carrying the rotating paddles passes through the said plate and carries a rotating arm located immediately above the said plate.

In one particular embodiment an apparatus in accordance with the invention includes on a common frame a vertical-shaft geared motor, a slide mounted on two guiderods parallel with the axis of the side-channel, means of driving the slide in alternating translation from the geared motor, means of attaching the sliding rod to the slide and means of driving the end of the vertical shaft in rotation step by step from the motion of the slide.

The result of the invention is a new product which constitutes a micro-proportioner which enables very small amounts of a divided product contained in a hopper to be distributed periodically.

The sliding rod constitutes a piston which introduces into the side-channel at the time of each of its forwards motions an amount of the product which is equal to the cylindrical volume contained in the mouth of the channel and the end of the sliding rod when it is lying at rear dead centre. This volume is very accurate and for a given stroke of the rod the amount introduced at the time of each to-and-fro of the sliding rod remains constant to 1%. It is very easy to make the proportioned amount vary by moving the rod longitudinally so as to make the position of rear dead centre vary.

The sliding rod may have a diameter distinctly smaller than that of the channel without the proportioned amount varying substantially. For example, for a channel having a diameter of 22mm a rod is employed which has a diameter of 10mm. The considerable clearance between the rod and the walls of the channel avoids packing of the powder in the channel and risks of blocking which result from it. It enables the apparatus to be employed for proportioning granular products.

The rotating paddles which equip an apparatus in accordance with the invention enable a regular and continuous bringing up of products to the mouth of the side-channel to be ensured in synchronism with the motion of the piston, so that the density of these products is constant and that there is no risk of voids in distribution.

The presence of a hollowed-out plate above the rotary paddles surmounted by a rotary finger enables it to be avoided that the weight of the products contained in the hopper is exerted upon the products located in the bottom and packs them.

The space lying between the said plate and the bottom of the hopper constitutes a decompression chamber and the density of the products contained in this chamber is independent of the degree of fill of the hopper.

The side-channel for discharge of the products, being offset with respect to the diameter of the bottom of the hopper, which is parallel with it, in the direction of rotation of the rotating paddles, displays the advantage that the mouth of the channel in the hopper exhibits the shape of a circular bevel orientated upstream with respect to the motion of the paddles passing in front of the mouth, so that as soon as the piston runs back, powdery products are pushed by the rotary paddles against this bevel and come and fill the free space between the mouth and the end of the piston.

The particular embodiment which includes a slide driven in alternating translation and driving simultaneously the sliding rod and a ratchet wheel which drives the rotating paddles, enables perfect synchronization to be ensured between the motion of the rotating paddles and the return stroke of the piston so that the paddles feed product to the mouth of the discharge channel as soon as the piston runs back.

Further, by moving the rear stop the position of rear dead center of the piston and the amount of product which is ejected during each forwards stroke of the piston is easily adjusted.

In the particular application in which the micro-proportioner apparatus in accordance with the invention is mounted upstream of an extruder which feeds an injection press, starting-up of the geared motor is controlled automatically by a relay or by a switch, closure of which is controlled at each opening of the injection mould by a limit-switch for the screw.

The number of strokes of the piston, which follows up each opening of the mould may easily be caused to vary automatically by equipping one of the movable parts, for example, the eccentric or the slide, with a limit-switch which sends a pulse during each stroke and by stopping the driving motor automatically when the predetermined number of pulses has been reached. By making this predetermined number vary it is possible therefore to adjust the number of proportioned amounts of powdery product which is injected at the time of each opening of the injection mould, depending upon the volume of the mould.

The description which follows refers to the attached drawings which illustrate one embodiment of an apparatus in accordance with the invention, without any restrictive character.

FIGS. 1, 2 and 3 illustrate a micro-proportioner apparatus designated as a whole by the reference 1.

Figure 1:
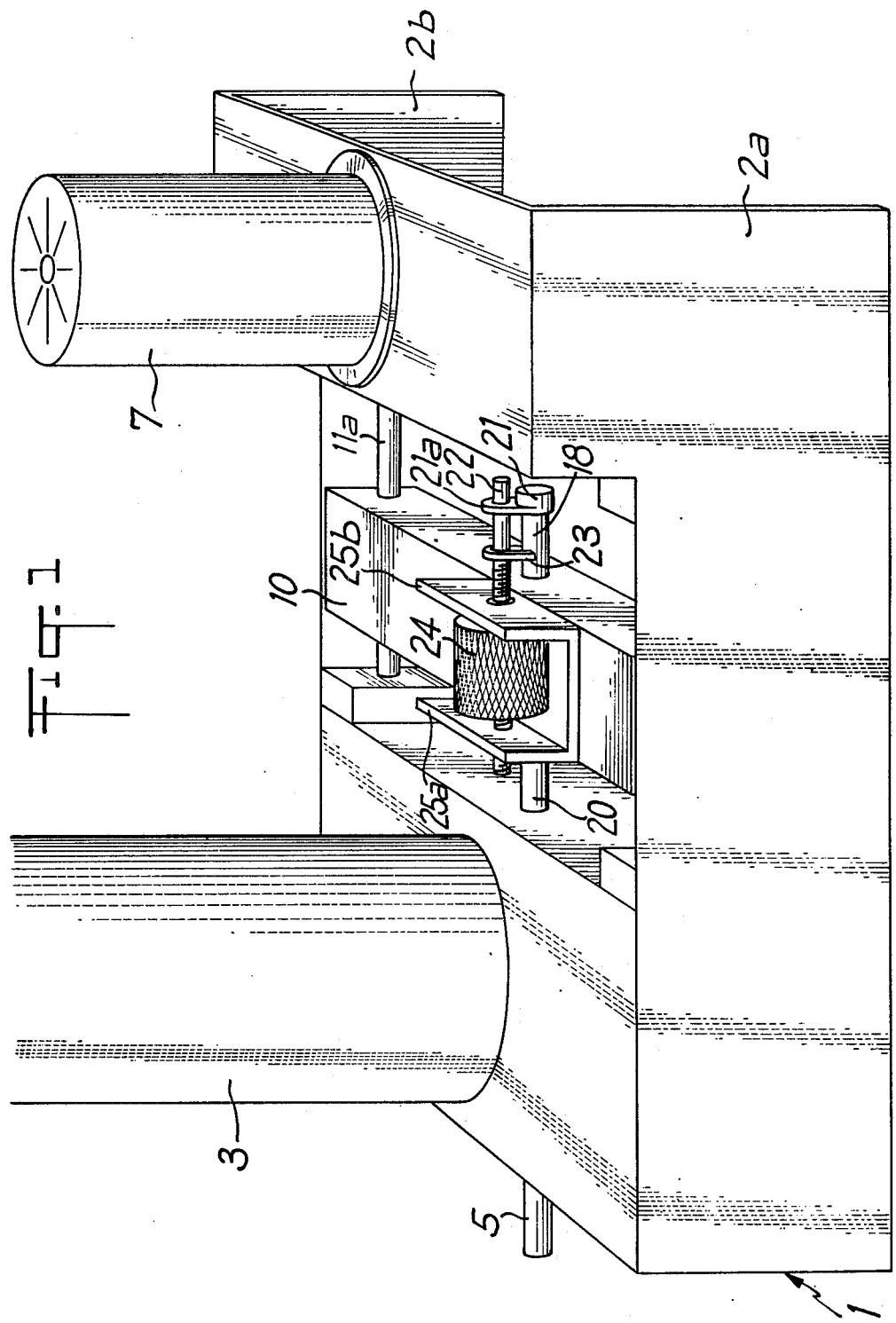
FIG. 1 is an overall perspective of an apparatus in accordance with the invention.

This apparatus includes a frame 2 consisting of sheet-metal folded in the shape of an inverted U the vertical arms 2a and 2b of which are used to support the apparatus. On this frame 2 is arranged a vertical cylindrical receiver 3 or hopper containing a powdery product, for example, a pigment intended for colouring thermoplastic resins.

The hopper 3 includes a fixed bottom 4 and a side channel 5 for discharge, which opens out slightly above the bottom of the hopper through an opening 6 and which is open at its outer end 5a.

The frame 2 supports a vertical-shaft geared motor 7, equipped with a small electric motor. This unit drives a disc 8 bearing an eccentric crankpin 8a onto which is hinged the end of a connecting-rod 9 the other end of which is hinged onto a slide 10 which is driven with an alternating motion the amplitude of which is equal to the amount of eccentricity of the crankpin 8a.

The slide 10 is mounted on two slideways 11a and 11b, parallel with the channel 5.

In the bottom and at the centre of the hopper 3 is arranged a vertical shaft end 12 upon which are mounted radial paddles 13 and 14 located respectively above and below the level of the channel 5.

On the bottom end of the shaft 12 is mounted a ratchet wheel or a freewheel 15. It is driven step by step, always in the same direction by a connecting rod 16 which is hinged to a pin 17 integral with the slide 10 so that when the slide runs back it drives the paddles 13 and 14 in rotation.

The slide 10 slides freely between stops, on a rod 18 which passes right through it.

At the end 18a of this rod located on the side next the hopper, which will be called the front end, is attached by a pin 19 a sliding rod 20 or piston, which is coaxial with the channel 5. This attachment of the piston 20 to the rod 18 by means of a pin enables these two parts to be easily disunited by removing the pin. The hopper with the rotating paddles and the rod 20 may then be withdrawn from the apparatus, which enables, for example, cleaning the hopper before filling it with another product or putting back on the apparatus a new hopper containing another product, for example, another pigment.

Figure 2:
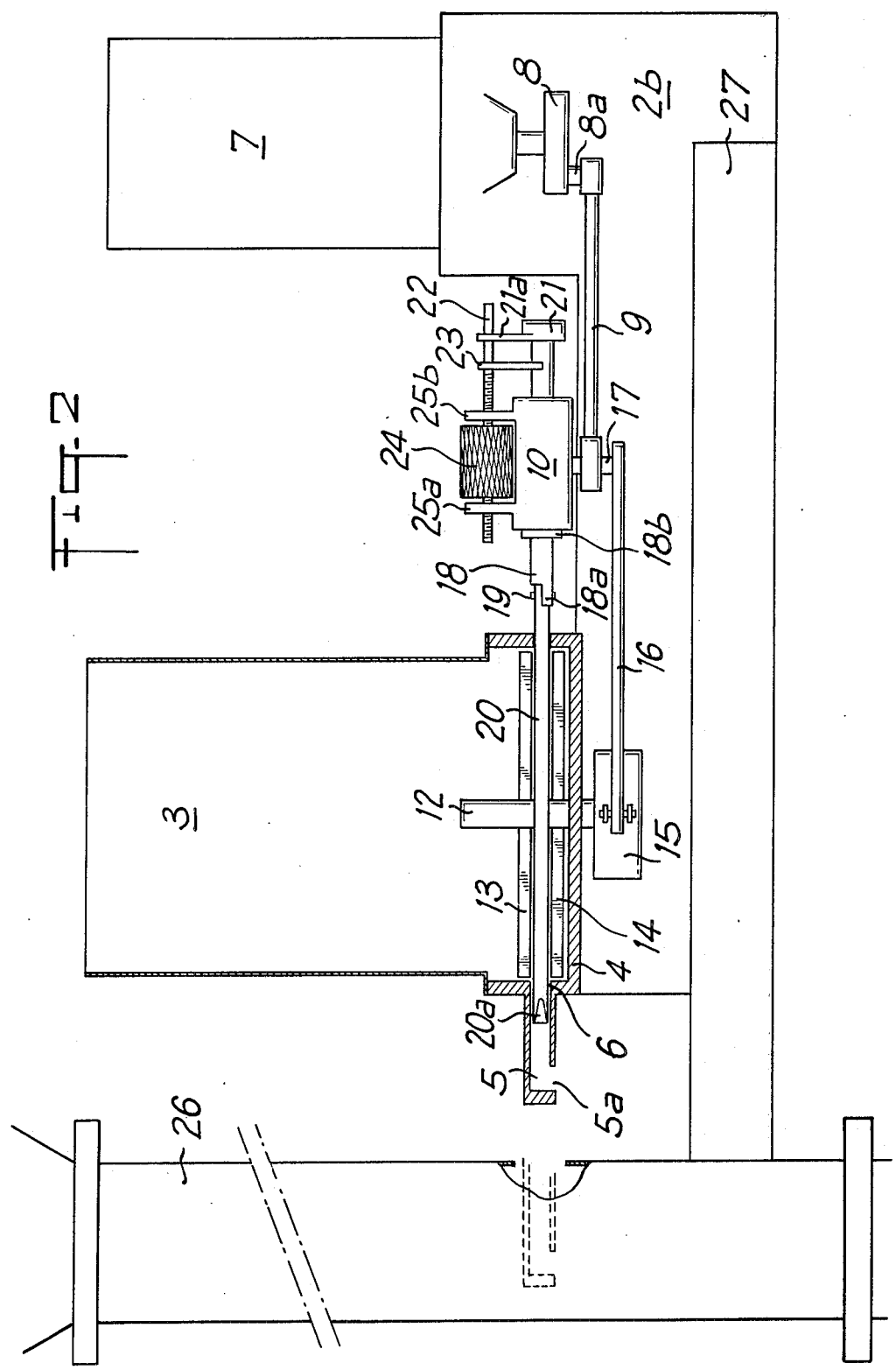
FIG. 2 is a longitudinal section through the apparatus as FIG. 1 mounted on a slide on the side of a feed channel to an extruder in the return position.

FIG. 2 shows the slide at front dead centre. The rod 18 bears a fixed collar 18b against which the slide comes to a stop when it advances, driving forwards with it the piston-bearer rod 18 and the piston 20. The latter enters the channel 5 as shown in the Figure, pushing before it an amount of product the volume of which is equal to the cylinder swept by the front end 20a of the piston 20. This end 20a is always advanced up to the same point in the channel 5.

The piston-bearer rod 18 carries at its rear end a flange 21 including an upwards elongation 21a through which passes freely a threaded rod 22. This threaded rod carries a stop 23 in the shape of a fork pointing downwards, which engages with the rod 18 along which it can slide freely between certain limits.

A ring 24 knurled externally and threaded internally is screwed onto the rod 22 and located between two stops 25a and 25b integral with the slide 10. By turning the ring 24 the screw 22 is moved in translation and also the fork 23 which is moved away from or towards the flange 21. When the slide 10 runs back it slides freely on the piston-bearer rod 18 until the stop 23 encounters the flange 21 and then by it drives the rod 20 in its return motion. The relative position between the variable stop 23 and the flange 21 enables the gap between the end 20a of the piston 20 and the mouth 6 of the channel 5 to be made to vary when the piston 20 is at rear dead centre and thus the proportioned amount injected at each piston stroke to be made to vary, which is proportional to this gap. The fork-shaped variable stop 23 engaged in the rod 18 avoids rotation of the threaded rod 22 when the knurled ring 24 is turned.

Of course the means employed in this example for adjusting the position of the variable stop 23 might be replaced by any equivalent means.

FIG. 2 shows an apparatus in accordance with the invention employed for injecting, for example, a colorant pigment or a powdery charge into a vertical channel 26 which connects, for example, a hopper located at the top part and containing thermoplastic resins to the inlet to an extruder located at the bottom part and intended for jellifying these resins and passing them into an injection press.

On the side of the channel 26 is mounted a horizontal slideway 27 in the shape of a trough in which the arms 2a and 2b of the frame are placed so that the apparatus can be easily moved forwards or backwards by making it slide in the trough 27 so that the front end 5a of the channel 5 is engaged in the channel 26 as shown in dotted line or is located outside the channel as shown in solid line, this second position enabling charging of the hopper 3, replacement of it or calibration of the proportioner.

The products outlet opening 5a is located at the bottom part of the channel 5, which avoids the risk of the resins which are falling in the channel 26 stopping up the channel 5 and disturbing the distribution of the proportioned amounts of pigment or of powdery charge contained in the hopper 3.

Figure 3:
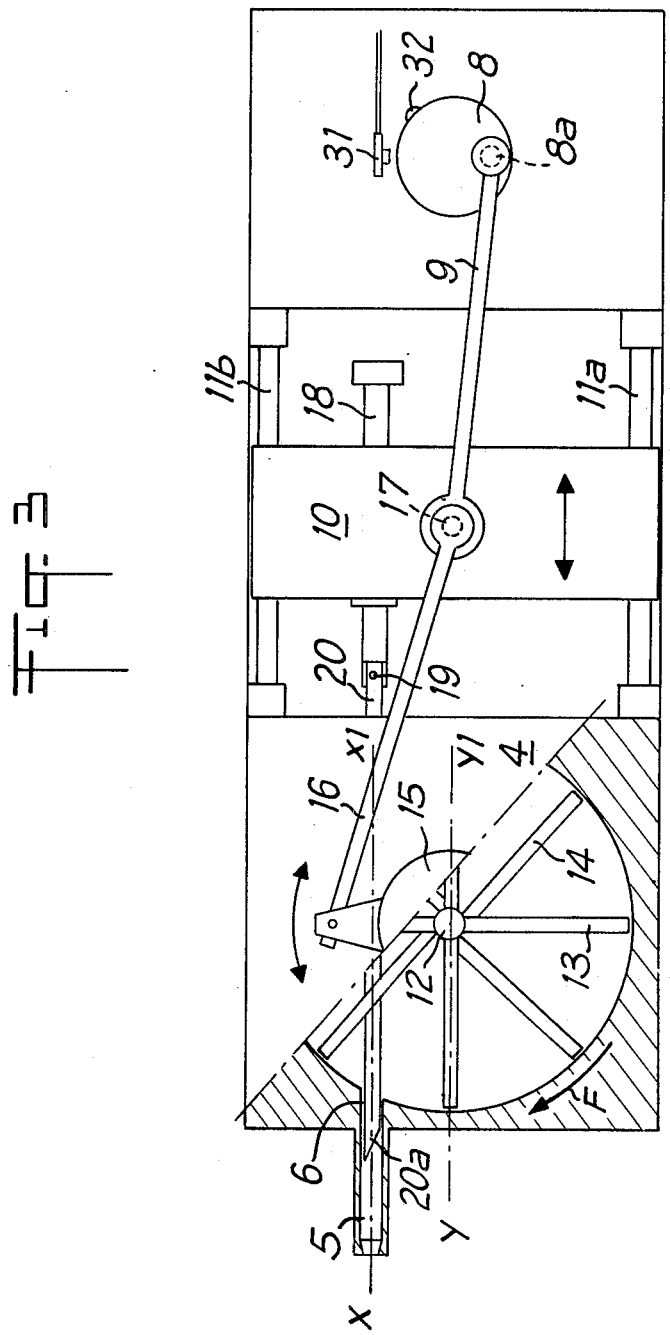
FIG. 3 is a view from below, partially cut away, of FIG. 1.

FIG. 3 shows at the left a view from below with partial cutting away of the bottom 4 of the hopper. This cutting away enables the end 20a of the piston 20 to be seen, engaged in the channel 5 and cut on the bevel.

It may be seen that the diameter of the end 20a of the rod 20 is distinctly less than the diameter of the channel 5. This large clearance is practically without effect upon the accuracy of the proportioning and has the advantage of avoiding any risk of packing of products in the channel 5 or of blocking of the piston 20.

There may likewise be seen one particular embodiment of the rotating paddles 13 and 14 mounted radially on the shaft-end 12 and offset angularly so that seen from above they present the shape of a V.

FIG. 3 likewise shows that the channel 5 and the sliding rod 20 are off-centred with respect to the hopper in order to miss the shaft 12. Because of this offset the mouth 6 of the channel 5 displays a bevel shape. The arrow F indicates the direction of rotation of the paddles when the slide runs back.

The offset of the axis x—x1 of the channel 5 with respect to the diameter y—y1 of the bottom of the hopper, which is parallel with it takes place in the direction of rotation. Consequently the bevel opening 6 faces the direction of movement of the paddles so that they beat back the products against this opening when the piston 20 has run back.

Figure 4:
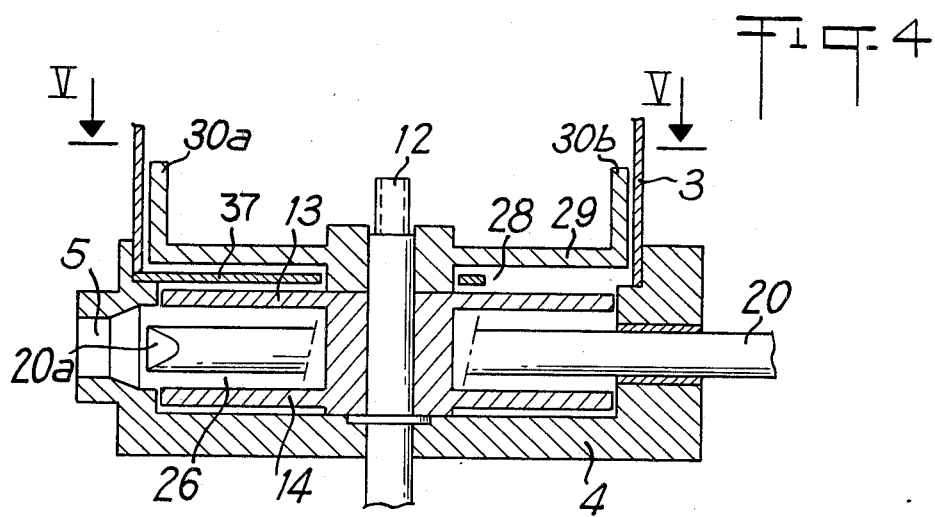
FIG. 4 is a vertical axial section through the bottom of the hopper.
Figure 5:
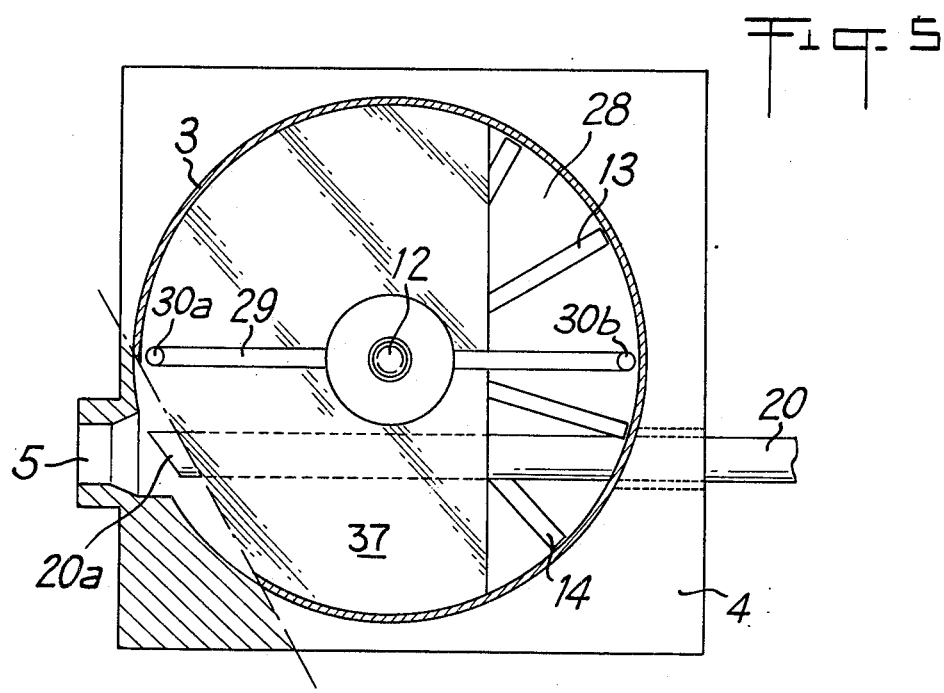
FIG. 5 is a plan view along VV in FIG. 4.

FIGS. 4 and 5 represent on a larger scale a partial section and a plan of a variant embodiment. In these Figures are seen the bottom of the hopper 3, the discharge channel 5, the sliding rod 20 and the end 20a of it which enters the channel 5, the vertical shaft end 12 and the rotary paddles 13 and 14 located respectively above and below the rod 20.

In order to avoid packing of the products in the bottom of the hopper, which being different depending upon the degree of fill of the latter would bring about differences in density and falsify the proportioned amount by weight, the bottom of the hopper 3 includes a decompression chamber 26, bounded by the bottom 4 and by a horizontal plate 37 which is located above the paddles 13 so that the rotating paddles 13 and 14, the sliding rod 20 and the channel 5 are located in the said chamber 26. The plate 37 has a cut-out 28 located at the side opposite from the channel 5. This cut-out has, for example, the shape of a circular cap as shown in FIG. 5. The shaft 12 passes through the plate 37 and carries a stirring member consisting, for example, of a diametral arm 29 equipped at each end with a finger 30a, 30b pointing upwards which moves to slide along close to the walls of the hopper 3.

FIG. 3 shows a contact 31 upon which a cam or pusher 32 located at the periphery of the disc 8 acts in order to produce an electrical pulse at the time of each stroke of the slide. This contact associated with a pulse counter enables the number of strokes and hence of the amounts injected to be adjusted automatically each time the apparatus is started up. Further, it enables the piston to be stopped in every case in the same position, which is necessary for obtaining perfectly homogeneous proportioned amounts.

Automatic operation of an apparatus in accordance with the invention, associated with an injection press, is as follows.

The volume of the mould is known and hence the quantity of pigment or charge to be injected into the resin at each opening of the mould. Opening of the mould controls by way of a relay or a limit-switch the automatic starting-up of the geared motor 7. Thanks to the knurled ring 24 the stroke of the piston 20 is adjusted so that the amount corresponding with each stroke of the piston is a submultiple of the amount to be injected, that is to say, equal to this amount divided by a whole number n and the number n is displayed on a programmer.

A comparator device compares the number of pulses recorded by the counter during the course of each cycle with the number n displayed and stops the apparatus automatically when the number n is reached and a new cycle starts again at the next opening of the mould.

Of course without departing from the scope of the invention the various constituent elements of the apparatus which has just been described by way of example may be replaced by equivalent elements fulfilling the same functions; in particular the means which drive the slide 10 in translation and the shaft 12 in rotation and the means which enable the movable stop 23 to be moved may be replaced by other means well known to those skilled in the art.

I claim:

1. A micro-proportioner apparatus for dispensing divided or powdery products including:
   a vertical hopper which contains said products, which hopper includes a bottom, a cylindrical side channel for outlet of the products, said channel having a mouth which opens slightly above the bottom of the hopper,
   a cylindrical sliding rod located inside said vertical hopper, coaxial with said channel and having a front end,
   two groups of rotating paddles located in said hopper, above said bottom in two horizontal planes with one of said groups located above and the other of said groups below said sliding rod; and means for driving said sliding rod periodically in reciprocating translation parallel with the axis of said channel, so that said front end of the sliding rod is alternatively inside said channel and outside said channel in spaced relation to the mouth of the channel to form a gap therebetween; and means for adjusting the gap between said front end of the sliding rod and said mouth of the channel to vary the amount of products dispensed at each sliding rod stroke.

2. An apparatus as claimed in claim 1 in which the outer diameter of said sliding rod is distinctly smaller than the internal diameter of said cylindrical side channel.

3. A micro-proportioner apparatus for dispensing divided or powdery products including:
   a vertical hopper which contains said products, which hopper includes a bottom, a fixed horizontal plate having an opening formed therein and being located in said hopper above said bottom and defining with said bottom a decompression chamber; and a cylindrical side channel for outlet of the products, said outlet opening into said decompression chamber, a cylindrical slide rod located inside said decompression chamber coaxial with said channel and having a front end, two groups of rotating paddles locatd inside said decompression chamber in two horizontal planes with one of said groups located above and the other of said groups located below said sliding rod, which paddles are mounted on a vertical shaft end; and means for driving said sliding rod periodically in reciprocating translation parallel with the axis of said channel and means for driving said paddles in rotation about a vertical axis.

4. An apparatus as claimed in claim 3 in which said vertical shaft end is coaxial with the bottom of the hopper which is circular, passes through said plate and carries a rotating arm located immediately above said plate.

5. An apparatus as claimed in claim 3 in which the common axis of said side outlet channel and of said sliding rod is off-centered with respect to said vertical shaft end.

6. An apparatus as claimed in claim 3 including on a common frame:
   the said hopper with said sliding rod and said two rotating paddles,
   a vertical shaft geared motor,
   two guide rods parallel with the axis of the said side channel,
   a slide mounted on said guide rods,
   means for driving the said slide in alternation translation along the said guide rods from said geared motor,
   means for connecting said sliding rod to said slide so that the slide moves without taking along the said rod over a portion of its stroke,
   and means for driving the said vertical shaft end in rotation step by step from the motion of the slide.

7. An apparatus as in claim 6 in which said means for driving said vertical shaft end in rotation includes a connecting rod one end of which is hinged to said slide and the other end of which drives step by step a ratchet wheel mounted on said shaft end so that it is driven in rotation in one direction only, solely when the slide runs back.

8. An apparatus as in claim 7 including a second rod parallel with the said side channel, which passes freely through the slide and to the front end of which is attached said sliding rod, which second rod carries in front of the slide a fixed stop and at the rear a flange against which there comes to bear a movable stop which is carried by a threaded rod which is screwed into a nut integral with the slide so that the said nut enables the stroke of the said sliding rod and the proportioned amount of product injected at each motion of it to be adjusted.

9. A micro-proportioner apparatus for dispensing divided or powdery products including:
   a vertical hopper containing said products and including, a bottom, a cylindrical side channel for said outlet of the products, said channel having a mouth which opens slightly above the bottom of the hopper; a cylindrical rod coaxial with said channel and adapted to slide therein; means for driving said rod periodically in alternating translation parallel with the axis of said channel; two groups of rotating paddles located in said hopper, with one group located above and the other below said sliding rod; means for driving said paddles in rotation about a vertical axis; said two groups of paddles being mounted on a vertical shaft in said hopper, and said apparatus including means for driving said shaft in rotation step by step in synchronism with the periodic movement of said sliding rod; and a common frame on which are mounted said hopper, a vertical-shaft geared motor, two guiderods parallel with the axis of said side-channel, a slide mounted on said guiderods, means for driving said slide in alternating translation along said guiderods from said geared motor, means for connecting said sliding rod to said slide so that the slide moves without taking along said rod over a portion of its stroke, and means for driving said vertical shaft in rotation step by step from the motion of the slide.

10. An apparatus as in claim 9 in which the means of driving
    the said vertical shaft end in rotation include a connecting-rod one end of which is hinged to the said slide and the other end of which drives step by step a ratchet wheel mounted on the said shaft end so that it is driven in rotation in one direction only, solely when the slide runs back.

11. An apparatus as in claim 10 including a second rod parallel
    with the said side-channel, which passes freely through the slide and to the front end of which is attached the said sliding rod, which second rod carries in front of the slide a fixed stop and at the rear a flange against which there comes to bear a movable stop which is carried by a threaded rod which is screwed into a nut integral with the slide so that the said nut enables the stroke of the said sliding rod and the proportioned amount of product injected at each motion of it to be adjusted.

* * * * *